Figure 1:
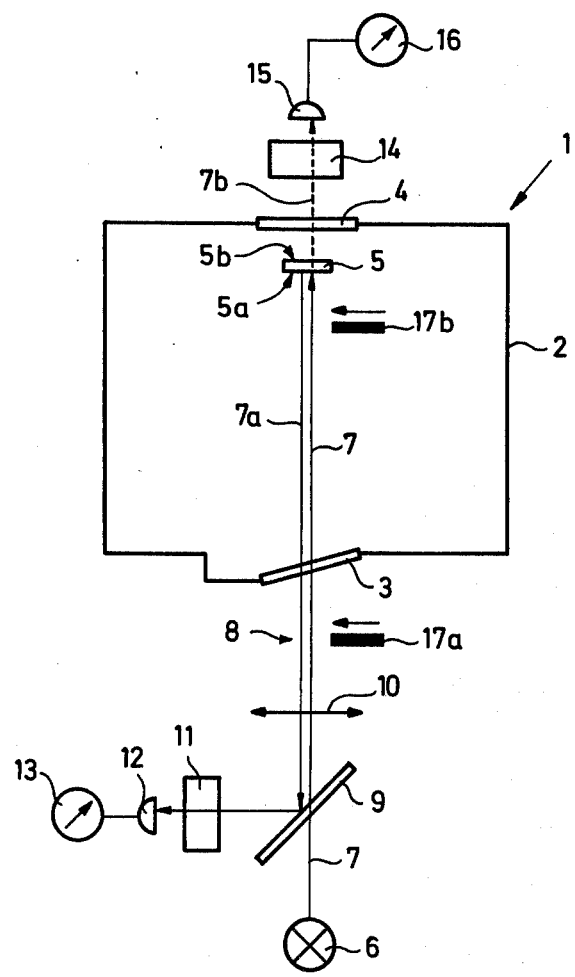

United States Patent [19]

Schwiecker et al.

[11] Patent Number: 4,469,713
[45] Date of Patent: Sep. 4, 1984

[54] METHOD OF AND PHOTOMETRIC ARRANGEMENT FOR MEASURING AND CONTROLLING THE THICKNESS OF OPTICALLY EFFECTIVE COATINGS

[75] Inventors: Horst Schwiecker, Kahl am Main; Alfons Zöller, Bad-Soden Salmünster, both of Fed. Rep. of Germany

[73] Assignee: Leybold-Heraeus GmbH, Cologne, Fed. Rep. of Germany

[21] Appl. No.: 411,238

[22] Filed: Aug. 25, 1982

[30] Foreign Application Priority Data

Sep. 8, 1981 [DE] Fed. Rep. of Germany ....... 3135443

[51] Int. Cl.³ .......................... G05D 5/03; G05F 1/66; B05D 1/00
[52] U.S. Cl. ..................................... 427/10; 356/281; 356/282; 356/4; 427/8
[58] Field of Search ..................... 427/8, 10; 356/281, 356/282

[56] References Cited

U.S. PATENT DOCUMENTS

| 3,773,548 | 11/1973 | Baker et al. | 427/10 |
| 4,024,291 | 5/1977 | Wilmanns | 427/10 |
| 4,068,016 | 1/1978 | Wilmanns | 427/10 |

Primary Examiner—Norman Morgenstern
Attorney, Agent, or Firm—Max Fogiel

[57] ABSTRACT

An arrangement for measuring and controlling the thickness of optically transparent coatings during their build-up on substrates in vacuum coating installations. The measurement is carried out by determining at least one reference value and at least one measured value for the transmission or reflection value of the coated object by using a measuring light beam, a monochromator, a photo-receiver, an amplifier and an analyzing circuit.

2 Claims, 4 Drawing Figures

METHOD OF AND PHOTOMETRIC ARRANGEMENT FOR MEASURING AND CONTROLLING THE THICKNESS OF OPTICALLY EFFECTIVE COATINGS

Subject matter related to the present invention is known from DE-OS No. 26 27 753, for example. In the known methods, the measurements or analyses have been carried out at the optical and/or electrical side of the arrangement and by continuous or intermittent comparison of the reactions in what is called a reference light beam. For example, part of a measuring light beam has been split off through a partly translucent mirror and passed to a separate reference light receiver. In this way fluctuations in the brightness of the measuring light source have been largely compensated (DE-OS No. 26 27 753). However, the effect of differing characteristic curves or of differing working points on the characteristic curves of the two light receivers has persisted.

It is also known to pass a split-off reference light beam, following multiple deflection and reflection on mirror systems, to the same photo-receiver as that to which the actual measuring light beam is passed. This occurs in an alternating manner on the basis of a chopping procedure, so that by corresponding retrieval at the output of the photo-receiver, the separated pulse sequences so formed can be analyzed, as regards the required compensation effect, by means of an analyzing circuit. In this system it is also known to use the same amplifier for both impulse sequences in order to eliminate the disadvantage of two separate amplifiers with differing amplification properties or characteristic curves.

However, a feature common to all the known methods is that they provide only what are called relative measurement results, i.e. results which are significant only when compared with specific reference values. If, for example, the spectral distribution of reflection and/or transmission of an object of measurement is received, then only a comparison with a sample, assumed to have ideal properties, will provide criteria regarding deviations of the object of measurement from the sample, i.e. relative differences relative to the sample.

Even if it were possible by means of an individual measurement within the spectrum, to obtain an absolute measured value—and this cannot be recognized by the operator without an object of comparison (sample)—this would not necessarily be valid for measurements using other wavelengths of the measuring light, i.e. over a particular selected range of the spectrum. The reason for this lies, on the one hand, in a differing distribution of intensity in the individual wavelengths of the initially polychromatic measuring light, but in particular, in the defective linearity of the characteristic curve of the amplifiers hitherto used for these measuring purposes.

The object of the present invention is, therefore, to provide a method and a photometric arrangement of the initially described kind whereby the measurement and display of absolute values for the transmission and/or reflection behaviour of coated objects are possible for any given thickness of coating, the method and arrangement being designed for individual wavelengths of the measuring light that is used as well as—optionally—for a particular spectrum so as, for example, to enable the spectral properties of the object to be represented in the form of a curve with absolute values.

Of very special importance in this connection is the linearity of the characteristic curve for the degree of amplification G, which curve must be linear over at least two powers of ten, with a deviation of at most 2% and preferably at most 1%. Such an amplifier may be formed for example by using a silicon photocell, which operates on the short-circuit principle and a quartz-stabilized lock-in amplifier. With an amplifier arrangement of this kind, it is possible to obtain linearity of the photometer above four powers of ten with an error which is less than 1% (absolute percent). The use of an amplifier of this kind is by no means insignificant, especially as, in the relative measuring methods used in the past, such far-going requirements did not exist and, indeed were not recognized.

The choice of the amplifier stands in causal relationship with the formation of the first reference value $I_L$ and of the second reference value $I_o$, which have a considerable, i.e. the maximum possible, spacing from each other. What are called the reference values are intensity values of that part of the measuring light beam that strikes the photo-receiver, this part being likely to fluctuate between 0% and 100% as is indicated hereinafter.

The stated reference values are of importance in the calibration of the measuring method and system. The arrangement is standardized by means of a two-point calibration. In the case of the transmission measurements and for the purpose of determining the first calibration point for $I_L$, either no test glass is arranged in the path of the beam, i.e. the measuring light beam is not weakened and its energy $I_L$ is 100% at the photo-receiver, or an uncoated test glass is introduced into the path of the beam. By means of the known refraction value of the test glass used, a specific transmission is obtained, e.g. $I_L = 92\%$ for a refraction value $n = 1.5$. For the reflection measurement use is made of an uncoated test glass which, however, has a roughened rear surface, so that the light is not diffusely reflected there.

Consequently, it is necessary to take into account only the reflection at one surface. The reflection value can again be calculated from the known refraction value of the test glass, e.g. 4.2% for a refraction value n of 1.5.

The second reference value $I_o$ likewise relates to the intensity occurring at the photo-receiver, which intensity, however, is very much lower and is 0 in the most favourable case. In order to obtain the second reference value $I_o$, the amplifier input is connected to earth during measurement of transmission, or what is called a zero shutter is introduced into the path of the beam. In the case of the reflection measurement, on the other hand, only the introduction of a zero shutter into the measuring light beam can be considered. The term "zero shutter" will be understood as meaning an opaque body which does not permit the passage and/or the reflection of any light at all. In the simplest case it is a movably mounted black plate with a matt surface. In order to inhibit any residual reflection, the black plate is expediently also wedge-shaped, so that at least one surface is angled in relation to the path of the beam. It follows from the above remarks that the reference values $I_L$ and $I_o$ are spaced from each other over a considerable distance.

This space can be further increased and can be exploited in the sense of providing maximum accuracy in indicating the measured values if the degree of amplification GL of the amplifier, as related to the uncoated test glass, is increased until the first reference value $I_L$ substantially reaches a maximum. This means that the first reference value $I_L$ should be as great as possible, but without the amplifier moving into the saturation range.

The invention is based upon the consideration that a straight line is determined by two points. Because of the distance between the first and second reference values, the necessary linearity can be achieved only with an amplifier which has the stated properties.

By storing the amounts $G_L$, $I_L$ and $I_o$ in proportion to the associated wavelength and possibly also in dependence upon the wavelength as represented by a curve, the values in question can be retrieved each time from a computer unit and, by means of calculating operations carried out by a microprocessor, they can be mathematically linked with the measured value I for the coated object or the object undergoing a coating operation. Whereas the calibration of the arrangement has been described above, the following remarks relate to the formation of the final measured value. Following calibration—and in dependence upon wavelength—the values for $I_L$ (the greatest possible in each case) and for $I_o$ are likewise stored as are the values for the degree of amplification $G_L$ for the uncoated test glass. It will be understood that the degree of amplification $G_L$ is in no way constant over the entire spectrum. Instead, it is found that the degree of amplification is at a minimum precisely at the middle of the spectral range of the visible light from the measuring light source, since the spectral intensity of the measuring light source is at a maximum at this point. If the first reference value $I_L$ is set to the greatest possible value, as happens automatically in the computer unit of the analyzing circuit, then although substantial constancy in the values for $I_L$ is obtained, this is by no means the case for $G_L$. This will be explained in the detailed description by reference to a graph.

The mathematical link-up is achieved in the following way:

For the absolute transmission T $$T=(I-I_o \cdot T_L)/(I_L-I_o)$$

(as a dimensionless number between 0 and 1) and for the absolute reflection R $$R=(I-I_o \cdot R_L)/(I_L-I_o)$$

(as a dimensionless number between 0 and 1). Therein:
 I = the value for the coated object, measured at the photo-receiver,
 $R_L$ = the calculable reflection of the uncoated test glass, calculated from the known refraction value, and
 $T_L$ = the transmission of the uncoated test glass, calculated from the known refraction value, or in the absence of a test glass, $T_L=1.0$.

Followinng the described calculating operations carried out automatically by the computer unit, the stored value or the stored values for $G_L$ is or are retrieved from the computer unit, and the variable degree of amplification G is formed on the basis of the following relationships:

For the transmission:

$$G=G_L \cdot T_L$$

and for the reflection $$G=G_L \cdot R_L$$

Then, in the computer unit, the measured value I is amplified or multiplied by the particular degree of amplification G and is represented in dependence upon the wavelength. Involved here are absolute transmission values T and absolute reflection values R, which can be displayed in the form of a graph by means of a projection screen, or shown as a number by means of a printer or a digital display system. Taken by themselves, the values and curves in question are totally valid for indicating the optical properties of the object concerned, and call for no comparative measurements involving samples, etc.

As already stated, this is possible by the use of an amplifier only if the signals at the output of the photo-receiver and the degree of amplification stand in a linear relationship over several powers of ten. By means of the subject-matter of the invention, very high resolution of the results of measurement is achieved, this being better than 1% o for the reflection measurement.

It is not absolutely necessary that the value I for the coated object, measured at the photo-receiver, should also likewise be stored in a store. Following calibration of the arrangement, it is easily possible to convert the measured value I immediately by means of the stated calculating operations and to display it. It is, however, particularly expedient if the measured value I is likewise stored in a store so that it can be retrieved for various calculating operations, or at a later point in time.

Further advantageous forms of the subject-matter of the invention and in particular advantageous details of the photometric arrangement will be seen from the remaining subsidiary claims.

An example of the subject-matter of the invention as well as its mode of operation will now be described in greater detail by reference to FIGS. 1 to 4.

Figure 2:
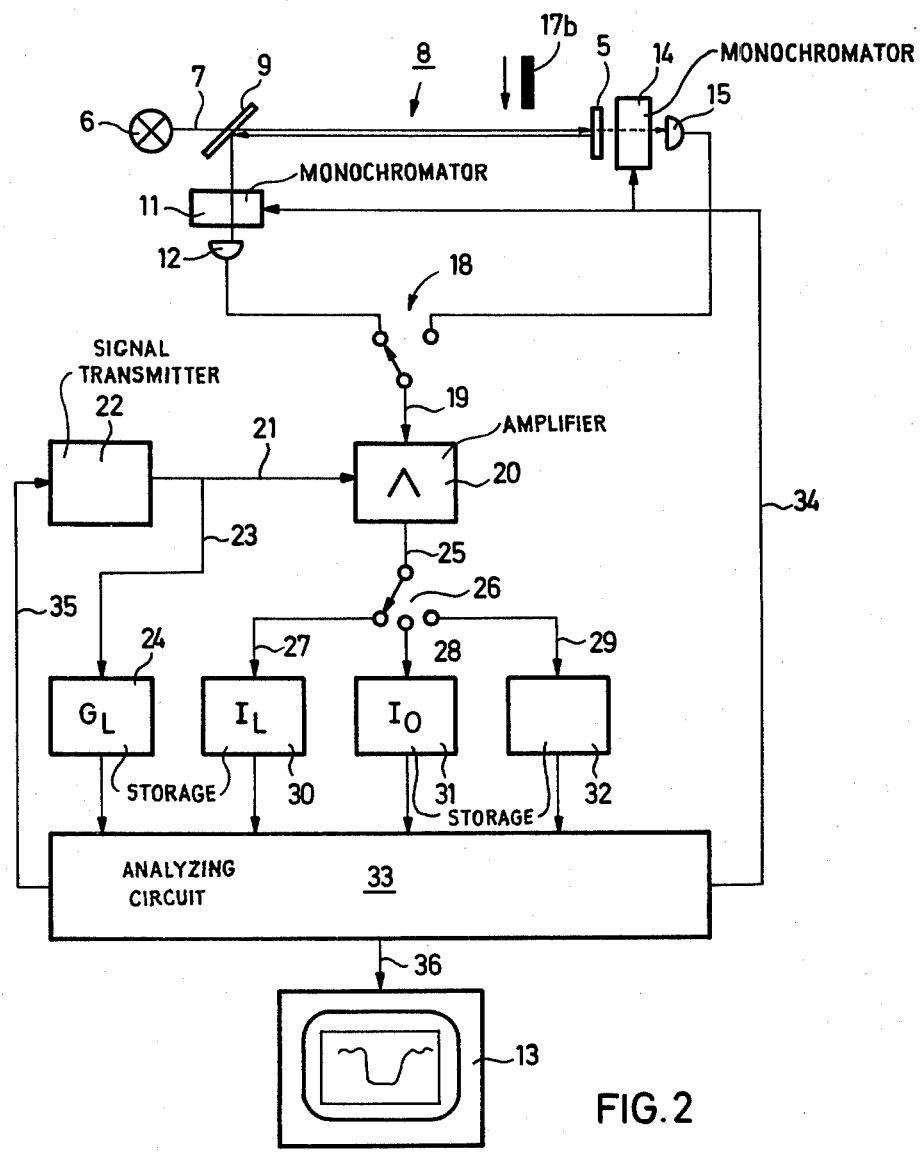
Figure 3:
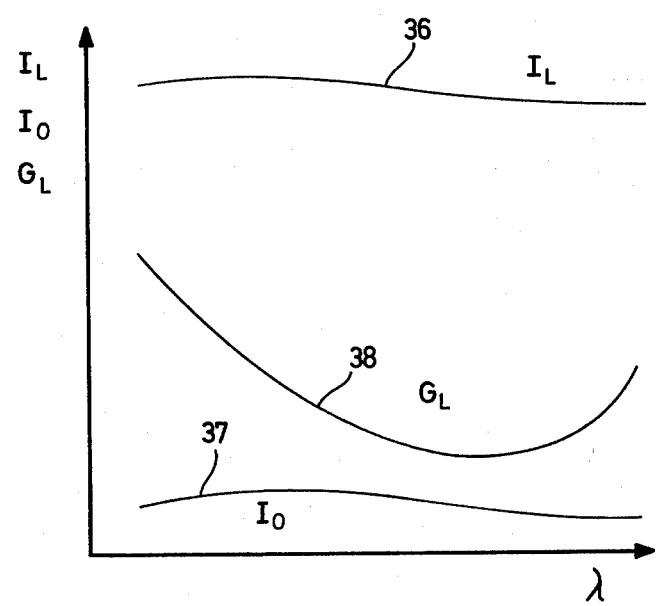
Figure 4:
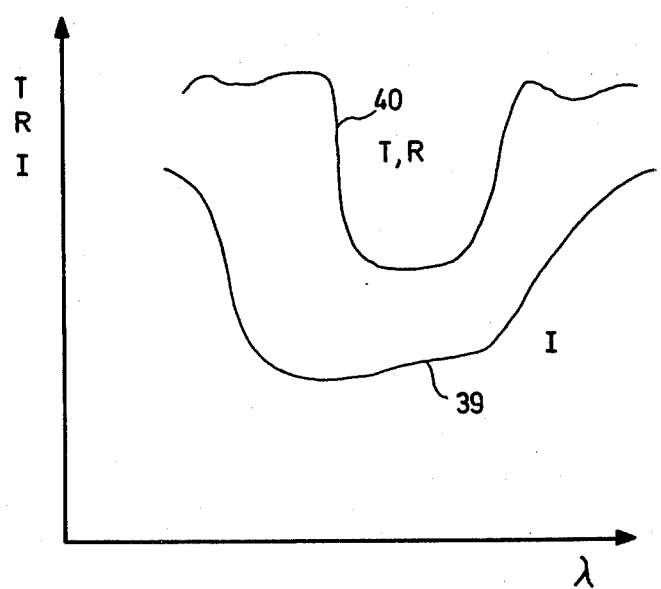

FIG. 1 is a diagrammatic illustration of the photometric arrangement in conjunction with a vacuum-coating installation, FIG. 2 shows the important parts of FIG. 1 in conjunction with the analyzing circuit and a display means, FIG. 3 shows, in graph form, the relationships between the first and the second reference values as well as the degree of amplification in the case of an uncoated test glass, plotted against wavelength, and FIG. 4 shows, in graph form, the relationship of the measured value for the coated object, measured at the photo-receiver, to the absolute transmission and reflection values, indicated by the display means, again plotted against wavelength.

FIG. 1 illustrates a vacuum-coating installation 1, which may be constructed as a vacuum-vaporization unit or a cathode-atomization unit. The sources for the production of the coating material (vaporizer or atomization cathodes) are not illustrated, since they form part of the prior art. Associated with the vacuum-coating installation is a vacuum chamber 2, which is provided with translucent windows 3 and 4. Arranged within the vacuum chamber 2 is an initially uncoated test glass 5 which is to be regarded as an object of measurement and represents a plurality of objects which can be coated simultaneously or in succession in the vacuum chamber 2. The carriers for the coatings are also referred to as substrates, and it is possible to carry out the measurements on the substrate as well as on a separate test glass. Since, in practice, the coating process is usually monitored by means of test glasses, reference will be made to the test glass herein. The substrate holder, usually present in the zone of the test glass, is likewise not illustrated.

Arranged outside the vacuum chamber 2 is a light source 6, from which a concentrated measuring light beam 7 passes towards the windows 3 and 4. The measuring light beam 7 defines a beam path 8, in which is arranged, initially at an angle of 45°, a mirror 9 which is permeable at one of its surfaces. Also positioned in the path 8 of the beam is an imaging lens 10. For carrying out a reflection measurement, it is important that the window 3 be fitted obliquely so that no light reflected from the window 3 can be reflected in the path 8 of the beam.

To the rear of the window 3, the measuring light beam 7 strikes the test glass 5, and (initially) the smallest portion of the light beam is thrown back as a reflected measuring light beam 7a as far as the partially translucent mirror 9. In the present case, a reflection measurement is involved. For this purpose, the test glass 5 has a planar front surface 5a, but a roughened or diffuse rear surface 5b, so that only the light reflected at the front face 5a passes back to the mirror 9.

The remaining measuring light beam 7a is reflected at the mirror 9 at an angle 90° and then strikes an adjustable monochromator 11. Only that part of the measuring light beam 7a to whose wavelength the monochromator 11 is set passes through the latter towards the photo-receiver 12. This is a silicon photo-receiver, the output of which is passed to a display means 13 by way of an analyzing circuit, not illustrated.

In the case of the illustrated arrangement, it is important that the measuring light beam 7 should strike the test glass 5 precisely at right angles, since any deviation therefrom leads to uncontrollable conditions as regards the reflection behaviour.

To the rear of the window 4 at that side of the window 4 that is remote from the light source 6 is arranged a further monochromator 14 which has the same function as the monochromator 11. Interference-line filters, interference-path filters or grid monochromators can be used as the monochromators for the present purpose. The transmission wavelength of an interference-path filter, as well as of a grid monochromator can be varied with the aid of a step-by-step motor which is not illustrated here so as to keep the drawing simple.

The measuring light beam remaining to the rear of the test glass 5 is indicated by the broken line 7b. The operation here involved is what is called the transmission measurement, i.e. the part of the measuring light transmitted through the test glass 5 passes through the monochromator as light of a specific wavelength, to the photo-receiver 15, which is in the same condition as the photo-receiver 12. The output of this latter photo-receiver is passed to the display means 16 by way of an analyzing circuit, likewise not illustrated.

For the transmission measurement, the test glass 5 has two planar i.e. flat surfaces; as mentioned initially, it may also be omitted in the transmission measurements during the calibration procedure, so that a light portion, which is greater by a few percent, passes to the photo-receiver 15.

FIG. 1 also shows two zero shutters 17a and 17b, only one of which, however, is required for each measurement. In order to avoid incorrect measurements, and when using the obliquely fitted window 3, either a zero shutter 17a must be provided, i.e. between the lens 10 and the window 3, or a zero shutter 17b must be arranged immediately in front of the test glass 5, i.e. between the window 3 and the test glass 5. The zero shutters are necessary at the stated positions since reflection occurs not only at the test glass or the object of measurement, but also at the lens, which may be fitted in a position which is not inclined.

In the measurement of the second reference value $I_o$, one of the two zero shutters 17a or 17b is swung into the path 8 of the beam in the direction indicated by the arrows, so that for the most part the measuring light beam is extinguished. As explained above, the zero shutters each preferably consist of a matt black plate, preferably of wedge shape, which causes maximum light absorption.

In FIG. 2 parts similar to those seen in FIG. 1 carry the same reference numerals as in the latter Figure. The outputs of the two photo-receivers 15 are connected to a change-over switch 18. In the illustrated position of the switch, reflection measurement is taking place, and when the switch is moved into the other position a transmission measurement can be carried out by means of the photo-receiver 15. From the change-over switch 18, a lead 19 runs to an adjustable amplifier 20, which has the properties described above. For the purpose of setting a specific degree of amplification $G_L$, a signal transmitter 22 is connected to the amplifier 20 through a lead 21, and the output of this signal transmitter is passed, through a lead 23, to a store 24 for storing the degree of amplification $G_L$ which, in the case of an uncoated test glass (or in the absence of a test glass), will have been determined by the above-described maximization of the first reference value $I_L$.

A lead 25 runs from the output of the amplifier 20 to a change-over switch 26, the outputs of which are connected to stores 30, 31 and 32 by way of leads 27, 28 and 29. The store 30 is used for storing the first reference value $I_L$, that has been arrived at with the maximum possible amplification without the amplifier having moved into the saturation range. The store 31 is used for storing the second reference value $I_o$ which has been obtained with the aid of the zero shutter (or, in a similar way, by earthing the amplifier inputs) and which has been amplified to the same degree $G_L$ as was the first reference vaue $I_L$. The store 32 is used for storing the actual measured value I of the coated object as measured at the photo-receiver.

All of the stores 24, 30, 31 and 32 are connected through corresponding leads to an analyzing circuit 33 in which is arranged a computer unit, not illustrated, whereby the above-described calculations are carried out.

A control lead 34 runs from the analyzing circuit 33 to the two monochromators 11 and 14 so that these are either set to a certain wavelength or are triggered to pass through a certain wavelength spectrum. A return lead 35 leads to the signal transmitter 22 for the degree of amplification. Thus, by means of the analyzing circuit 33, a degree of amplification is selected that is just great enough for the first reference value $I_L$ to reach a still permissible value before the amplifier 20 becomes saturated.

The analyzing circuit 33 is connected by a lead 36 to a display means 13 which is shown as a screen but which could be replaced by a co-ordinate recorder, a printer or a digital display unit when, for example, only a single measured value is to be indicated in the case of a particular wavelength.

In the graph shown in FIG. 3, the x-axis shows the wavelength, whereas the y-axis indicates the trend of the first and second reference value as well as of the degree of amplification $G_L$. No units of size have been shown since the intention is merely to clarify the measuring principle. It will be seen that curve 36 for the first reference value $I_L$ is practically horizontal following a rise due to corresponding amplification. Curve 37 exhibits a roughly similar course for the second reference value $I_o$. On the other hand, curve 38 for the degree of amplification $G_L$ behaves completely differently; this curve represents the required degree of amplification that must be set in order to obtain the highest possible values for $I_L$. This curve has a pronounced minimum.

In FIG. 4, the x-axis again relates to the wavelength, whereas the y-axis indicates the trend of the measured value I obtained with a coated test glass at the output of the photometer, the absolute transmission or reflection values also being shown. Curve 39 indicates the spectral course of the measured value I, which illustrates the spectral dependence of reflection and transmission, though the values are only relative and merely permit a rough estimation of the results of the coating method. However, on the basis of the above-described calculating operations, the spectral dependence of the transmission and reflection values T, R is shown in absolute values by curve 40. Although this curve is similar to curve 39, because of the variable degree of amplification (curve 38 in FIG. 3), it is correspondingly corrected, i.e. curve 39 is "distorted" compared with the absolute curve 34.

We claim:

1. A method of measuring and controlling the thickness of optically transparent coatings during their build-up on substrates in vacuum coating apparatus, comprising the steps of: determining at least one reference value and at least one measured value for the transmission or reflection behavior of the coated object with a measuring light beam, a monochromator, a photo-receiver, an amplifier and an analyzing curcuit;

providing an adjustable amplifier having a degree of amplification G, which has a linear characteristic over at least two powers of ten with a deviation of at most 2%; forming for calibration purposes at each wavelength a first reference value $I_L$ in:

transmission measurement by measuring unimpaired measuring light beam or only the measuring light beam passing through an uncoated test glass, or reflection measurement by measuring the measuring light beam reflected from an uncoated test glass having a diffuse rear surface;

increasing the degree of amplification G in the case of an uncoated test glass until said first reference value $I_L$ reaches substantially a maximum;

storing in respective storages the maximum reference value for $I_L$ and the associated degree of amplification for the uncoated test glass:

forming a second reference value $I_o$ during:

transmission measurement by disconnecting the amplifier input or by introducing a zero shutter into the measuring light beam;

reflection measurement by introducing a zero shutter into the measuring light beam;

amplifying the second reference value $I_o$ to the same degree as the first reference value $I_L$, and storing in a further storage, so that all of the quantities $G_L$, $I_L$ and $I_o$ are then stored proportionally to the associated wavelength, and in that for measuring purposes at each wavelength, forming a measured value I, transmission T or reflection R for measuring at each wavelength, stored values for $I_L$ and $I_o$ as well as the value for I being retrieved from a computer unit, and then determining absolute transmission T in accordance with the relationship $T=(I-I_o \cdot T_L)/(I_L-I_o)$ or determining reflection R in accordance with the relationship $R=(I-I_o \cdot R_L)/(I_L-I_o)$ wherein I is the measured value for the coated object as measured at the photo-receiver, $R_L$ is the reflection of the uncoated test glass, and $T_L$ is the transmission of the uncoated test glass, or is 1.0 if no test glass is present, retrieving stored value for GL from the computer unit and determining variable degree of amplification G in accordance with the relationship $G=GL \cdot T_L$ for the transmission $G=GL \cdot R_l$ for the reflection measured value I being amplified by the degree G and being presented in dependence upon the wavelength.

2. A method according to claim 1, wherein measured value I is also stored and is retrieved from the computer unit for said step of forming a measured value I, transmission T or reflection R.

* * * * *